United States Patent [19]
Wagner et al.

[11] 3,888,994
[45] June 10, 1975

[54] CHOLERETIC MEDICINE

[75] Inventors: Josef Wagner, Grunwald; Helmut Grill, Vaterstetten, both of Germany

[73] Assignee: Chemisch-Pharmazeutische Fabrik Adolf Klinge & Co., Munich, Germany

[22] Filed: Oct. 23, 1973

[21] Appl. No.: 408,945

[30] Foreign Application Priority Data
Oct. 26, 1972    Germany............................ 2252637

[52] U.S. Cl. ................................................ 424/342
[51] Int. Cl.² ......................................... A61K 27/00
[58] Field of Search ............................ 424/342, 339

[56] References Cited
OTHER PUBLICATIONS
Simon – Chem. Abst. Vol. 65, (1966), p. 20689b.
Chem. Abst. Subject Index Vol. 65, (1966), p. 2802S.
Hine et al. – J. of Pharmacology and Exptl. Thera. – Vol. 97, (Sept.–Dec. 1949), pp. 414 to 419.

*Primary Examiner*—Sam Rosen
*Attorney, Agent, or Firm*—Karl W. Flocks

[57] ABSTRACT

A choleretic medicinal composition having as an active ingredient the formula

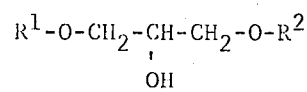

in which $R^1$ and $R^2$ can be identical or different and represent straight or branched alkyl radicals with 1–8 C atoms which are saturated or contain a double bond and are optionally substituted by a lower alkoxy radical, or represent cycloalkyl radicals with 5–6 atoms, and a pharmaceutical diluent.

1 Claim, No Drawings

CHOLERETIC MEDICINE

This invention relates to choleretic medicines. Choleretics are active compounds which markedly activate the formation of bile fluid. They are therefore used therapeutically in certain diseases of the liver or of the gall bladder. Chemical compounds of greatly varying structure have proved to be usable choleretics in medical practice. 2-[6-Chloro-3-pyridazinyl)-thio]-N,N-diethyl-acetamide, described in Arzneimittelforschung, Volume 14, page 266 (1964), which is a relatively complicated nitrogen-containing compound, has proved of value in medical practice. Admittedly, it is less active than the N-(3-alkoxy-2-hydroxypropyl)-anilines or N,N-bis-(3-alkoxy-2-hydroxypropyl)-anilines described in German Offenlegungsschriften Nos. 1,543,900 and 2,110,872.

According to a further proposal, phenyl ethers, namely 1-phenoxy-3-alkoxy-propanols-(2), also possess a strong choleretic activity, even in relatively low doses.

It has now been found, surprisingly, that glycerine dialkyl ether possesses an excellent choleretic activity even at low doses.

This property has already been observed in the case of some simple alkyl ethers. Thus, for example, the bis-(3-hydroxybutyl) ether described in Arzneimittelforschung volume 2, page 122 (1952) has already become accepted in therapy. 2-(2-Hydroxybutoxy)-3-hydroxybutane, the choleretic action of which has been described in German Offenlegungsschrift No. 2,164,997, is a similar compound. On the other hand what is new is that the 1,3-dialkyl ethers of glycerine, which are in part known as organic solvents, have an unusually strong choleretic activity.

According to the invention, the new choleretically active medicines contain, as active compounds, 1,3-dialkylglycerine ethers of the general formula

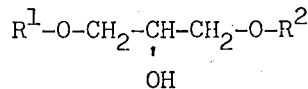

in which $R^1$ and $R^2$ can be identical or different and represent straight or branched alkyl radicals with 1–8 C atoms which are saturated or contain a double bond and are optionally substituted by a lower alkoxy radical, or represent cycloalkyl radicals with 5–6 C atoms.

The compounds are colourless liquids with, in most cases, a slight fruity odour which can be used as polar solvents, the solvent properties being determined by the size of the alkyl substituents. The lower representatives, up to and including the isopropyl ether derivatives are completely miscible with water. With increasing alkyl chain length the solubility in water diminishes, whilst the lipophilic properties increase. Because of this spectrum of different solubilities, glycerine dialkyl ethers have already been employed as solvents in the paint and plastics industry (compare Chem. Ind., volume 49, page 1,021 (1930)).

In testing their suitability for industrial use, these compounds have also already been tested for their toxicity and it was found that all the glycerine dialkyl ethers tested, whilst tolerated well, possessed a degree of muscle-relaxing action which only manifests itself recognisably at high doses, as can be seen from the publication in J. Pharmacol. Exp. Therap., volume 97, page 414 (1949). Their use as medicines has therefore never been considered seriously.

It is therefore very surprising that these glycerine dialkyl ethers possess, even at low doses, an excellent choleretic activity which, because of their low toxicity, makes them suitable for use as active compounds for choleretic medicines.

These compounds can be manufactured in various ways. They can be obtained by reacting alkyl halides with monosodium salts of 3-alkoxy-propane-1,2-diols or with disodium salts of glycerine, analogously to a Williams ether synthesis. Symmetrical glycerine dialkyl ethers are preferentially obtained by reaction of 3-halogeno-1,2-epoxy-propanes or 1,3-dihalogeno-propanols-(2) with the alcohols in question in the presence of alkalis, the alcohol preferentially being employed in excess. A further possible method of synthesis is to react 3-alkoxy-1-chloropropanols-(2) with the desired alcohols in an alkaline medium, the reaction taking place via the glycidyl ethers formed as intermediates. In many cases it has proved of value first to isolate the glycidyl ether and then to carry out the addition reaction with the appropriate alcohol in the presence of alkaline or acid catalysts, aromatic hydrocarbons optionally being used as solvents.

Table 1 lists a number of the compounds falling under the general formula, with their boiling points.

TABLE I 1,3-Dialkoxy-propanols-(2)

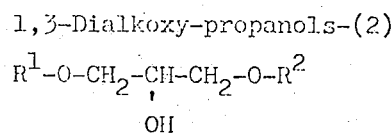

| Compound No. | Substituents $R^1$ | $R^2$ | Boiling point °C/mm Hg |
|---|---|---|---|
| 1 | Methyl | Methyl | 103–4/40 |
| 2 | Methyl | n-Propyl | 85/14 |
| 3 | Methyl | i-Propyl | 83/20 |
| 4 | Methyl | Allyl | 131/30 |
| 5 | Methyl | n-Butyl | 90/20 |
| 6 | Methyl | t-Butyl | 80/14 |
| 7 | Methyl | n-Pentyl | 99/12 |
| 8 | Methyl | i-Pentyl | 134/50 |
| 9 | Methyl | 2-Ethoxyethyl | 115/14 |
| 10 | Methyl | n-Hexyl | 119/14 |
| 11 | Methyl | Cyclohexyl | 140/13 |
| 12 | Methyl | n-Octyl | 150/35 |
| 13 | Ethyl | Ethyl | 123/63 |
| 14 | Ethyl | n-Propyl | 90/14 |
| 15 | Ethyl | i-Propyl | 34–5/0.08 |
| 16 | Ethyl | n-Butyl | 135/50 |
| 17 | Ethyl | 2-Methoxyethyl | 146/50 |
| 18 | Ethyl | Cyclopentyl | 160/50 |
| 19 | Ethyl | n-Hexyl | 162/50 |
| 20 | n-Propyl | n-Propyl | 138/60 |
| 21 | n-Propyl | n-Butyl | 111/14 |
| 22 | n-Propyl | n-Pentyl | 174/35 |
| 23 | i-Propyl | n-Butyl | 35/0.01 |
| 24 | Allyl | Allyl | 60/0.08 |
| 25 | Allyl | n-Butyl | 117/1 |
| 26 | n-Butyl | n-Butyl | 104–5/2 |
| 27 | n-Butyl | n-Pentyl | 98/0.03 |
| 28 | n-Butyl | n-Hexyl | 152–3/13 |
| 29 | i-Butyl | i-Butyl | 102–3/12 |
| 30 | 2-Butenyl | 2-Butenyl | 101/0.01 |

The pharmacological examinations of the compounds according to the invention, using rats as test animals, show a strong choleretic action even at low doses. The investigations were carried out by the following methods:

Male and female Sprague-Dawley rats weighing 240–260 g, kept under standard conditions and kept fasting for 16 hours before the beginning of the experiment, were narcotised with 1.2 g of ethylurethane/kg, administered intraperitoneally. The abdominal cavity was opened medially, the duodenum was exposed and a thin PVC catheter (internal diameter 0.4 mm, external diameter 0.95 mm, length 120 mm) was tied into the ductus choledochus. For administration of the test substances, a second, shorter and thicker PVC tube was tied into the duodenum distally from the papilla Vateri. After placing the intestine back into position, the abdominal wall was closed with Herff's clamps. In order to keep the normal body temperature of the animals as constant as possible during the experiment, the rats were kept on a thermostatically heated special table.

1½ hours after the operation, that is to say after stabilisation of the bile flow, the secreted bile was collected in small tared glass beakers and the moist weight was determined at intervals of 30 minutes, over a duration of the experiment of at least 3 hours. The test substances were administered intraduodenally as a 5% strength emulsion in an 0.25% strength aqueous agar solution, using 0.1 ml/100 g of body weight. The control animals only received the corresponding amount of agar solution.

The percentage increase in bile secretion compared to untreated control animals was calculated over a period of 3 hours. At least 6 animals were used for each dosage group and control group.

To determine the average lethal dose (LD 50) of the test substances, fasting male and female NMRI mice weighing 16–19 g were used. The test substances were administered by means of a probang, again as an emulsion in an 0.25% strength aqueous agar solution. The time of observation was 9 days and for each test substance at least 5 dosage groups and 10 animals per group were used.

The results of the pharmacological investigations of the compounds listed in Table 1 are shown in Table 2. 2-[(6-Chloro-3-pyridazinyl)-thio]-N,N-diethylacetamide, a choleretic described in Arzneimittelforschung, volume 14, page 266 (1964), and well accepted in medical practice, was employed as the comparison compound.

Table 2

| Compound No. | % increase (3 hours) 50 mg/kg administered intraduodenally | LD 50 in mice mg/kg administered orally |
| --- | --- | --- |
| 1 | 18 | >3,000 |
| 2 | 58 | >3,000 |
| 3 | 60 | >3,000 |
| 4 | 31 | 2,530 |
| 5 | 60 | 1,840 |
| 6 | 82 | >3,000 |
| 7 | 58 | 1,270 |
| 8 | 32 | 2,500 |
| 9 | 54 | >3,000 |
| 10 | 57 | 1,500 |
| 11 | 66 | 1,500 |
| 12 | 52 | >3,000 |
| 13 | 50 | >3,000 |
| 14 | 32 | >3,000 |
| 15 | 58 | >3,000 |
| 16 | 55 | 1,975 |
| 17 | 52 | 3,000 |
| 18 | 60 | 1,700 |
| 19 | 44 | >3,000 |

Table 2-Continued

| Compound No. | % increase (3 hours) 50 mg/kg administered intraduodenally | LD 50 in mice mg/kg administered orally |
| --- | --- | --- |
| 20 | 31 | 2,300 |
| 21 | 42 | 2,140 |
| 22 | 32 | >3,000 |
| 23 | 50 | 2,580 |
| 24 | 57 | 2,200 |
| 25 | 56 | 1,390 |
| 26 | 77 | 3,650 |
| 27 | 49 | >3,000 |
| 28 | 28 | >1,500 |
| 29 | 27 | 2,000 |
| 30 | 53 | 1,300 |
| X 23* | 21 | 1,150 |

*X 23 = 2-[(6-Chloro-3-pyridazinyl)-thio]-N,N-diethyl-acetamide

The results summarised in Table 2 show clearly that the compounds according to the invention are distinctly superior to a choleretic which has already been used therapeutically.

The compounds according to the invention are appropriately directly incorporated into the pharmaceutical preparations. They can be converted into the customary forms for administration, such as capsules, tablets, dragees, solutions or emulsions, and also into depot forms. They are manufactured by mixing the active compounds with known auxiliaries, for example with inert diluents, such as vegetable oils, colloidal silica, disintegrating agents, such as corn starch or alginic acid, binders, such as starch or gelatine, and agents for achieving a depot effect, such as carboxymethylcellulose or polyvinyl acetate.

Liquid forms for oral administration of the active compounds according to the invention can contain sweeteners, such as glycerine, or flavour-improving agents, such as vanillin or citrus extracts. Solubilising agents, such as Tween, can also be present.

Capsules containing the active compound can be manufactured, for example, by dissolving the active compound in vegetable oil and filling the solution into soft gelatine capsules by the Scherer process. For administration as tablets, the active compound can be mixed with half the quantity of colloidal silica and be pressed in a known manner to form tablet cores, which can optionally be dragee-coated or coated with a film of resin.

The text which follows describes the synthesis of some examples of this class of compound and illustrates the manufacture of medicinal preparations according to the invention by two examples.

EXAMPLE 1

1,3-Di-n-butoxy-propanol-(2)

65.05 g (0.5 mol) of n-butyl glycidyl ether are added dropwise, whilst stirring, to a solution of 5.61 g (0.1 mol) of finely powdered potassium hydroxide in 300 ml of n-butanol and the reaction mixture is then heated for 8 hours under reflux with exclusion of atmospheric moisture. After cooling, the alcohol present in excess is removed in vacuo, the liquid residue is taken up in chloroform and the chloroform solution is passed over a frit with aluminium oxide (Woelm neutral, activity level 1) to remove by-products. The solvent is distilled from the filtrate and the residue (crude yield 78%) is fractionated in vacuo until it is pure according to gas chromatography and thin layer chromatography. Boil-

EXAMPLE 2

1,3-Di-n-propoxy-propanol-(2)

43.0 g (0.33 mol) of 1,3-dichloropropanol-(2) in 20 ml of n-propanol are slowly added dropwise, whilst stirring, to a solution of 40.0 g (1 mol) of finely powdered sodium hydroxide in 300 ml of n-propanol and the mixture is subsequently heated for 8 hours under reflux. After cooling, it is neutralised with dilute hydrochloric acid, the sodium chloride which has separated out is removed, and the solution is freed of excess alcohol. The crude product, which is obtained in high yield, is subsequently fractionated in vacuo until it is pure according to thin layer chromatography. Boiling point 138°/60 mm, yield: 39.1 g (66.6% of theory).

EXAMPLE 3

3-n-Propoxy-1-methoxy-propanol-(2)

27 g (0.23 mol) of n-propyl glycidyl ether are slowly added dropwise, whilst stirring, to a solution of 0.08 g of boron trifluoride ethyl etherate in 51 g (1.6 mols) of methanol at room temperature and the mixture is subsequently heated for 12 hours under reflux. After cooling, the methanol which is present in excess is distilled off under normal pressure and the residue is fractionated in vacuo. Boiling point 85°/14 mm; yield 17.5 g (65.6%)

EXAMPLE 4

To manufacture soft gelatine capsules, the active compound of the formula

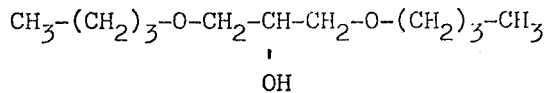

was employed in the following mixture:

| | |
|---|---|
| 1,3-Di-n-butoxy-propanol-(2) | 100.0 mg |
| Wax mixture | 50.0 mg |
| Soya lecithin | 3.0 mg |
| Vegetable oil | ad 450.0 mg |

The active substance together with the other two additives is dissolved in the vegetable oil (triglyceride mixture of saturated medium chain-length fatty acids) and the solution is filled by the Scherer process into oval capsules (7.5) of 0.462 ml capacity.

EXAMPLE 5

The active compound of the formula

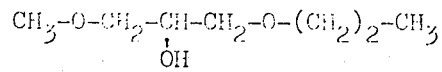

was processed as follows for the manufacture of dragees which each contained

| | |
|---|---|
| 3-n-Propoxy-1-methoxy-propanol-(2) | 50.0 mg |
| Cellulose powder | 150.0 mg |
| Colloidal silica | 46.5 mg |
| Magnesium stearate | 6.0 mg |
| Castor sugar | ad 300.0 mg |

50 kg of active compound, 45 kg of silica, 150 kg of cellulose powder and 55 kg of castor sugar were mixed uniformly and granulated. The granules were mixed with a further 1.5 kg of silica and 6 kg of magnesium stearate and pressed to give dragee cores weighing 300.0 mg (9 mm diameter). The cores can be dragee-coated, or coated, in the usual manner, with the aid of titanium dioxide, calcium carbonate, yellow lacquer and orange lacquer, talc and sugar syrup.

What is claimed is:

1. A method of producing a choleretic effect in a patient in need of said therapy comprising:
   orally administering, in unit dosage form, to a patient in need of said therapy, a choleretic-effective non-toxic amount of a 1,3-dialkyl glycerine ether of the formula

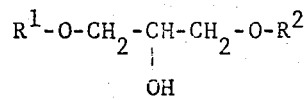

in which $R^1$ and $R^2$ can be identical or different and represent straight or branched alkyl radicals with 1–8 C atoms which are saturated or contain a double bond and are optionally substituted by a lower alkoxy radical, or represent cycloalkyl radicals with 5–6 C atoms, and a pharmaceutical diluent.

* * * * *

UNITED STATES PATENT AND TRADEMARK OFFICE
Certificate

Patent No. 3,888,994                            Patented June 10, 1975

Josef Wagner and Helmut Grill

Application having been made by Josef Wagner and Helmut Grill, the inventors named in the patent above identified, and Chemisch-Pharmazeutische Fabrik Adolf Klinge & Co., a corporation of Germany, Munich, Germany, the assignee, for the issuance of a certificate under the provisions of Title 35, Section 256, of the United States Code, adding the name of Gernot Hofrichter as a joint inventor, and a showing and proof of facts satisfying the requirements of the said section having been submitted, it is this 4th day of May 1976, certified that the name of the said Gernot Hofrichter is hereby added to the said patent as a joint inventor with the said Josef Wagner and Helmut Grill.

FRED W. SHERLING,
*Associate Solicitor.*